J. S. PEOPLES.
APPARATUS FOR PROPORTIONING STREAMS OF FLUID.
APPLICATION FILED DEC. 24, 1919.
1,393,824.
Patented Oct. 18, 1921.
2 SHEETS—SHEET 2.
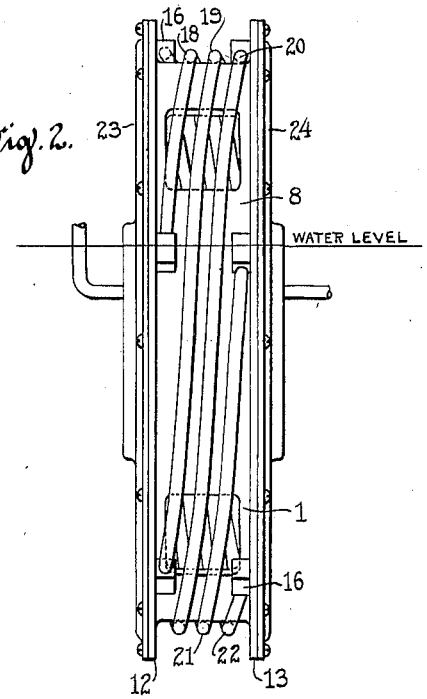
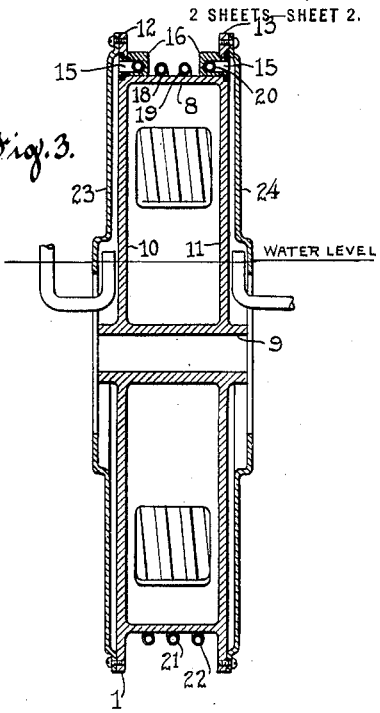
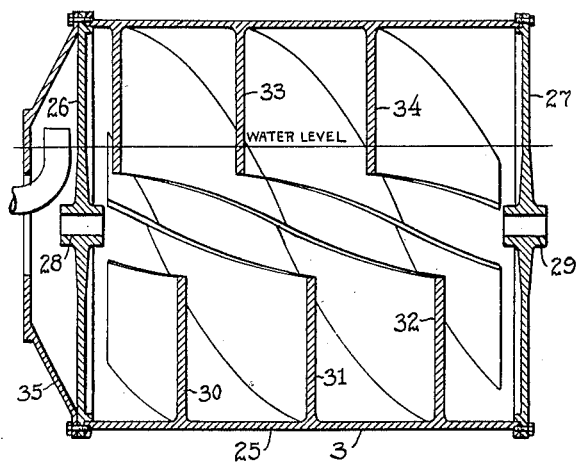
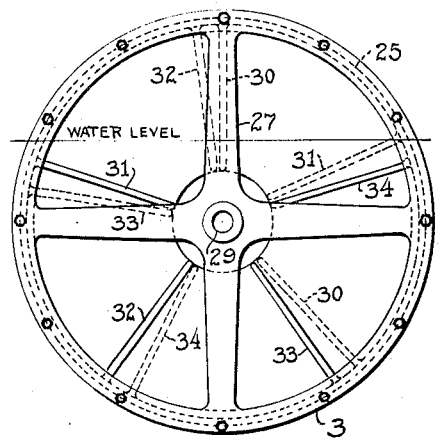
INVENTOR.
John S. Peoples
BY Frank H. Hubbard
ATTORNEY

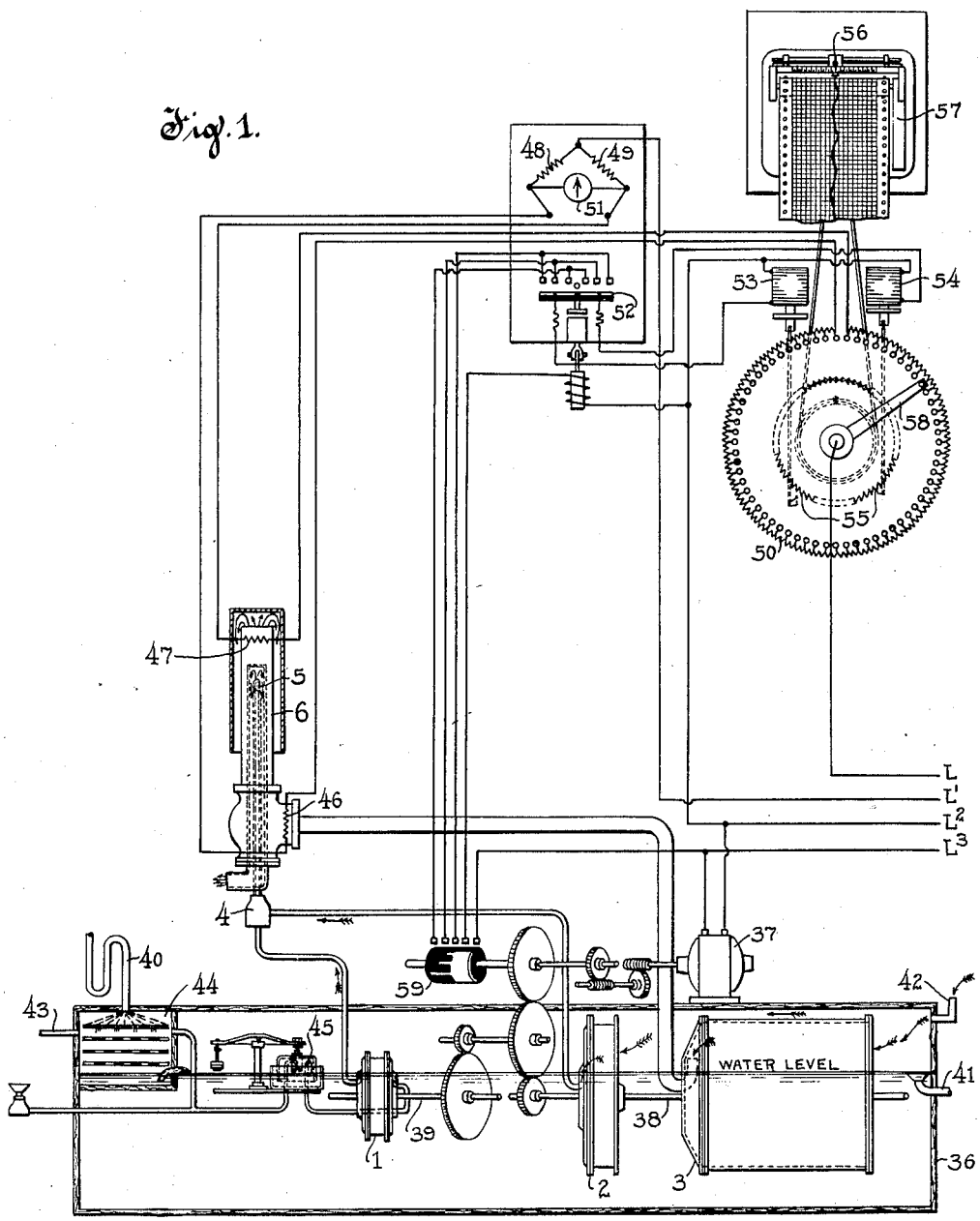

UNITED STATES PATENT OFFICE.

JOHN S. PEOPLES, OF MILWAUKEE, WISCONSIN, ASSIGNOR TO THE CUTLER-HAMMER MFG. CO., OF MILWAUKEE, WISCONSIN, A CORPORATION OF WISCONSIN.

APPARATUS FOR PROPORTIONING STREAMS OF FLUID.

1,393,824.   Specification of Letters Patent.   Patented Oct. 18, 1921.

Application filed December 24, 1919. Serial No. 347,215.

*To all whom it may concern:*

Be it known that I, JOHN S. PEOPLES, a citizen of the United States, residing at Milwaukee, in the county of Milwaukee and State of Wisconsin, have invented new and useful Improvements in Apparatus for Proportioning Streams of Fluid, of which the following is a full, clear, concise, and exact description, reference being had to the accompanying drawing, forming a part of this specification.

This invention relates to apparatus for proportioning streams of fluid for use in calorimetry and other industrial processes. It has heretofore been proposed, as set forth in the application of H. N. Packard, Serial No. 347,227, filed December 24, 1919, to provide apparatus including a plurality of standard wet displacement meters to supply gas and air or other fluids in streams bearing a fixed volumetric ratio, said apparatus subjecting the fluids to like temperature, pressure and saturation conditions to insure a constant quantity ratio of said fluids and the present invention relates more particularly to improvements in such apparatus.

One object of the invention is to provide apparatus including meters operable by external power whereby the pressure of the fluids to be supplied may be reduced without impairment of the operation of the meters and whereby the likelihood of errors due to relative variations in level of the water seals of the meters is greatly reduced.

Another object is to provide apparatus enabling the use of a common liquid seal for the several meters without impairment of the function of said apparatus by changes in level of the water seal even though the meters are of different capacities.

Another object is to provide apparatus adapted to supply relatively small quantities of fluid and enabling variation of the quantity ratio of the fluids supplied thereby between exceedingly wide limits to suit requirements.

Another object is to provide an improved meter for the aforesaid and other uses which will supply a continuous stream of fluid with substantially the same degree of accuracy for the whole of a fractional part of each revolution thereof.

Other objects and advantages of the invention will hereinafter appear.

The accompanying drawing illustrates one embodiment of the invention which will now be described, it being understood that the apparatus illustrated is susceptible of various modifications falling within the scope of the appended claims.

In the drawing,

Figure 1 diagrammatically illustrates the complete apparatus;

Figs. 2 and 3 illustrate in detail certain meters shown in Fig. 1; and,

Figs. 4 and 5 illustrate in detail another meter shown in Fig. 1.

Referring to Fig. 1, the same shows apparatus comprising three meters 1, 2 and 3 embodied in a calorimeter for measuring the heating value of gases. The meters 1 and 2 are utilized to supply test gas and air to the mixing chamber 4 of an inclosed burner 5 while the meter 3 is utilized to supply air to a tube 6 surrounding the inclosure of the burner. The temperature rise of air in tube 6 caused by the heat of combustion of the test gas is utilized as a measure of the heating value of the gas and thus the several streams of gas and air must bear a fixed known quantity ratio.

The gas meter 1, as shown in Figs. 2 and 3, preferably comprises a drum 8 having a central bearing 9 and having its end plates 10 and 11 extended to provide peripheral flanges 12 and 13, each of said flanges being provided with five equidistantly spaced orifices 15. Also, each flange has adjacent to each of said orifices a block 16 drilled at right angles to provide a passage communicating with such orifice and the drum has peripherally arranged thereon five tubes 18 to 22 of equal length, each having one end fitted into a block 16 of the flange 12 and its opposite end fitted into a block 16 of the flange 13. Thus each tube connects orifices in opposite sides of the drum and the drum is provided on opposite sides with annular cover plates 23 and 24 providing chambers connected by said tubes. As shown, each tube extends three-fifths of the peripheral distance of said drum but they may be of any other preferred length which will insure a proper liquid seal thereof.

Accordingly assuming the meter to be provided with a suitable water or other liquid seal and to be supplied with gas entering the chamber formed by cover plate 24, rotation of the meter will cause the gas to be conveyed through the tubes 18 to 22 to the chamber formed by the cover plate 23, the arrangement of tubes providing for a continuous and uniform supply of gas to the latter chamber. In this connection it is to be noted that in the five passage meter shown, gas is always discharged from two adjacent passages simultaneously thus minimizing variations in discharge due to mechanical errors in structure, such errors tending to cause considerable variation in discharge of the ordinary meter having a lesser number of passages. Moreover the tubes enable supply of gas in exceedingly small quantities and if the bore of each tube is uniform the meter will function as accurately for fractions of a revolution as for a complete revolution.

The air meter 2, which is only required to supply a relatively small quantity of air, is preferably of the same construction as the gas meter except that the cover plate 24 is omitted.

The air meter 3, as shown in Figs. 4 and 5, preferably comprises a cylinder 25 supported by end members 26 and 27 respectively provided with alined bearings 28 and 29, and with quadrant openings to permit free passage of air through said cylinder. Interiorly the cylinder is provided with five helicoidal fins 30 to 34 of equal length and pitch, which are preferably arranged within the drum as best shown in Fig. 5. Thus assuming the meter to be provided with a water seal and to be rotated, the fins will function like the tubes of the above described meter to supply a continuous stream of air at a uniform rate for all fractions of a revolution and such a meter may be designed to supply a relatively large volume of air or other fluid. The end of the cylinder from which air is discharged is provided with a cover plate 35 providing a compartment from which the air may be conveyed.

Again referring to Fig. 1, the three meters are mounted in a common tank 36 containing a quantity of water forming a common water seal therefor and are all arranged to be driven by a single electric motor 37 for operation thereof at the desired relative speeds. As shown, the two air meters are provided with a common shaft 38 and the gas meter with a separate shaft 39 said shafts being connected to the motor through suitable gearing although it is to be understood that the air meters might be provided with separate shafts and that the various meters could be connected to their common driving means in any other preferred manner.

The tank 36 is provided with a water supply line 40, an overflow 41, an air inlet 42, a gas inlet 43 and a compartment 44 into which the water and gas inlets discharge. Thus both the gas and air entering the tank are brought into contact with the water for saturation and equalization of their temperatures, the air being freed in the tank and the gas being conveyed from the saturation compartment to the gas meter through a regulator 45 of a well known form to equalize the pressure of the gas with the air pressure within the tank. The air pressure may accordingly be varied to suit conditions, any variation thereof causing a corresponding variation of the gas pressure and as the meters are driven by external power the air may be supplied at atmospheric pressure, if desired.

With a common water seal for the several meters any variation in level of the water seal will affect the discharge of all of the meters but meters of the type disclosed may be proportioned to maintain the desired volumetric ratio of the streams supplied thereby regardless of ordinary fluctuations in the water level in the tank even though one meter has a capacity per revolution 150 times as great as that of another. While in the case of ordinary wet meters of different capacities the smaller will be affected to a greater degree by a given variation in level of the water seal thereof the tubular construction of the smaller capacity meters illustrated renders it possible to equalize the influences of fluctuation in level of the common water seal upon the several meters. Each of the meters 1 and 2 carries but a small amount of gas or air inclosed in tubes arched well above the water level and having only a small cross section of the gas or air in contact with the water surface while the meter 3 carries a much larger amount of air having a much larger area of contact with the water in the tank. Accordingly should the meters be of uniform diameter the capacity of the tubular meters would be influenced to a lesser degree than that of the meter 3 and hence by reducing the diameter of the tubular meters to the proper degree relative to that of the meter 3, said meters may be made to maintain a given volumetric ratio regardless of ordinary fluctuations in water level.

Thus as the apparatus subjects the gas and air to like temperature, pressure and saturation conditions, the meters being maintained at like temperatures by the common water seals and being influenced alike by fluctuations in level of the water seal it will be apparent that operation of the meters at given relative speeds by the motor 37 will insure a constant quantity ratio of the gas and air supplied to the testing apparatus. Hence the heating value of the test gas may accurately be determined by measuring the temperature rise of the air subjected to the heat of combustion.

The means shown for measuring the temperature rise of the air caused by the heat of combustion of the test gas is identical with that disclosed in the aforesaid application of H. N. Packard. Briefly described, said means comprises a resistance thermometer 46 arranged adjacent the inlet end of tube 6, a resistance thermometer 47 arranged adjacent to the outlet end of said tube, said resistances being included in a Wheatstone bridge including additional resistances 48 and 49 and an adjustable rheostat 50. This Wheatstone bridge has connected therein a galvanometer 51 having associated with its needle an electromagnetic switch 52 controlling the operating magnets 53 and 54 of a ratcheting mechanism 55 which serves to both shift the marker 56 of a B. T. U, recorder 57 and also operate the arm 58 of rheostat 50. The operating winding of switch 52 is controlled by a contact drum 59 operated by the motor 37 and the arrangement is such that for a given heating value of the gas corresponding to the position of the marker of the B. T. U. recorder the Wheatstone bridge will be balanced to render the ratcheting mechanism inert whereas a change in the heating value of the gas will unbalance the Wheatstone bridge causing the switch 52 to operate a number of times varying with the degree of unbalancing of the bridge to effect a corresponding movement of the marker 56 and adjustment of the rheostat to restore the Wheatstone bridge to balanced position.

What I claim as new and desire to secure by Letters Patent is:

1. Apparatus for supplying a plurality of streams of fluid having a constant volumetric ratio, comprising, in combination, a plurality of wet displacement meters, common external operating means for said meters and operative connections insuring a given speed ratio of said meters and affording a medium of adjustment of such ratio.

2. Apparatus for supplying a plurality of streams of fluid having a constant volumetric ratio including a plurality of wet displacement meters, external operating means for said meters whereby the pressures of the fluids may be reduced without impairment of the operation of said meters and means insuring substantial equalization of the pressures of the fluids entering said meters.

3. Apparatus for supplying a plurality of proportionate streams of fluid comprising a plurality of separate wet displacement meters having a common liquid seal.

4. In apparatus for supplying proportionate streams of fluid, in combination, a plurality of separate wet displacement meters having a common liquid seal and external operating means for said meters insuring a given speed ratio thereof and including driving connections affording a medium of adjustment of such speed ratio.

5. Apparatus for supplying a plurality of proportionate streams of fluid comprising a plurality of wet displacement meters having a common liquid seal, external operating means for said meters and means for insuring substantial equalization of the pressures of the fluids entering said meters.

6. Apparatus for supplying a plurality of proportionate streams of fluid comprising a plurality of wet displacement meters, a tank containing a common liquid seal for said meters, external operating means for said meters, certain of said meters receiving fluid which first enters said tank and a fluid supply line for another of said meters having a regulator rendering its pressure proportional to the pressure of the fluid within said tank.

7. Apparatus for supplying a plurality of proportionate streams of fluid comprising a plurality of wet displacement meters, a tank containing a common liquid seal therefor and containing a fluid at given pressure to be supplied by certain of said meters, a fluid supply line to another of said meters having a regulator to render the pressure of such fluid proportional to that of the former fluid and means for operating said meters and maintaining a constant speed ratio thereof.

8. Apparatus for supplying a plurality of streams of fluid having a constant quantity ratio including a plurality of wet displacement meters for supplying such streams, means associated therewith insuring like temperature, pressure and saturation conditions of the fluid supplied to said meters thereby and means for operating said meters and maintaining a constant speed ratio thereof.

9. Apparatus for supplying proportionate streams of fluid, comprising a plurality of separate wet displacement meters of different diameters and a common liquid seal for said meters, the meter of lesser diameter having means whereby fluctuations in the level of the liquid seal effects its volumetric discharge in a like percentage to that of the meter of larger diameter.

10. Apparatus for supplying proportionate streams of fluid comprising a plurality of wet displacement meters of different capacities and a common liquid seal therefor, the meter of lesser capacity having means whereby the area of contact between the fluid passing therethrough and the liquid seal is proportionately less than that of the larger meter.

11. Apparatus for supplying a plurality of proportionate streams of fluid comprising a plurality of separate wet displacement meters of different capacities and a common liquid seal therefor, the meter of larger capacity subjecting the fluid passing therethrough to contact with the liquid seal throughout a considerable area and the meter of smaller capacity having passages for the fluid to be supplied thereby and providing for an area of contact between the latter fluid and the liquid seal such that the output of the meter of smaller capacity is maintained proportional to that of the meter of larger capacity upon fluctuations in level of said liquid seal.

12. Apparatus for supplying a plurality of proportionate streams of fluid comprising a plurality of wet displacement meters of different capacities and a common liquid seal therefor, the meter of larger capacity subjecting the fluid passing therethrough to contact with the liquid seal throughout a considerable area and the meter of smaller capacity having tubes forming passages for the fluid to be supplied thereby and providing for an area of contact between the latter fluid and the liquid seal such that the output of the meter of smaller capacity is maintained proportional to that of the meter of larger capacity upon fluctuations in level of said liquid seal.

13. Apparatus for supplying proportionate streams of fluid comprising a plurality of wet displacement meters of different capacities having a common liquid seal and external operating means for said meters insuring a fixed speed ratio thereof, the meter of larger capacity comprising a drum having helicoidal fins forming passages for the fluid to be supplied by said meter and subjecting the fluid to contact with the liquid seal throughout the length of said passages and the meter of lesser capacity having tubular passages for the fluid to be supplied thereby and restricting the latter fluid to contact with the liquid seal throughout a relatively small area, said meters being proportioned for porportional outputs upon fluctuations in level of the liquid seal.

14. A wet displacement meter comprising a rotatable member having means providing five helicoidal passages for the fluid passing therethrough, said passages being spaced uniformly at their intake and outlet ends circumferentially of said member.

15. A wet displacement meter comprising a rotable member having peripheral flanges provided with equi-distantly spaced orifices and a plurality of tubes arranged peripherally on said member, each of said tubes extending partially around said member and forming a passage between openings in said flanges.

16. A wet displacement meter comprising a rotatable member having peripheral flanges provided with equidistantly spaced orifices, a cover plate fixed to one of said flanges to form a fluid chamber communicating with the orifices in the latter flange and a plurality of tubes of equal length arranged on the periphery of said member, each of said tubes extending partially around said member and forming a passage between orifices in said flanges.

17. A wet displacement meter comprising a rotatable member having peripheral flanges provided with equi-distantly spaced orifices, cover plates fixed to said flanges to provide fluid chambers communicating with the orifices in their respective flanges and five tubes of equal length arranged peripherally on said member, each of said tubes extending partially around said member and forming a passage between orifices in said peripheral flanges.

In witness whereof, I have hereunto subscribed my name.

JOHN S. PEOPLES.